Figure 1:
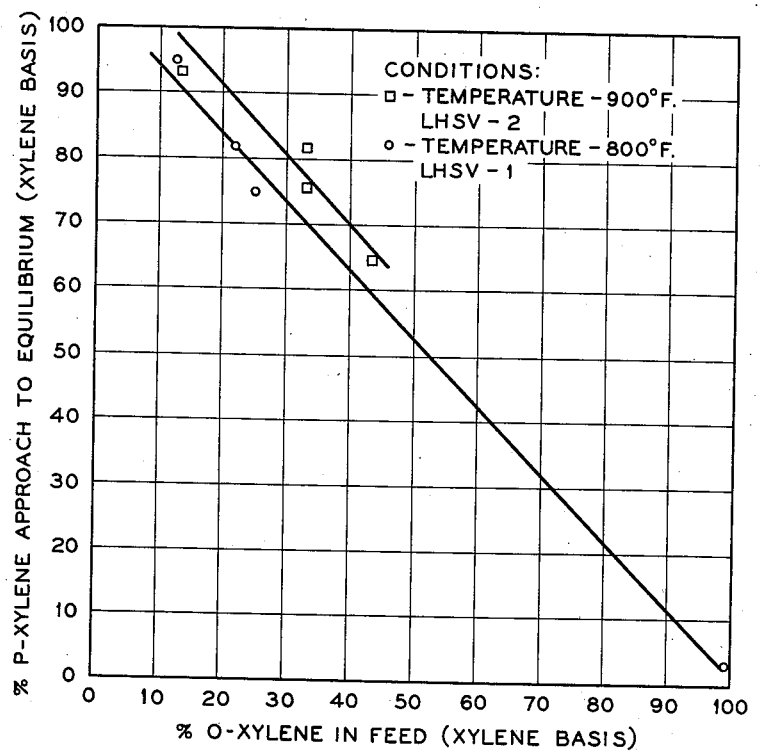

United States Patent Office 2,837,582
Patented June 3, 1958

2,837,582

P-XYLENE VAPOR PHASE ISOMERIZATION

Roger W. Hill, El Cerrito, and Alfred J. Engel, Berkeley, Calif., assignors to California Research Corporation, San Francisco, Calif., a corporation of Delaware Application May 24, 1954, Serial No. 431,686

1 Claim. (Cl. 260—668)

This invention relates to the isomerization of aromatic hydrocarbons and pertains more particularly to the catalytic isomerization of xylene mixtures containing ortho-, meta-, and para-xylenes.

Para-xylene is currently being separated from mixed xylene isomers in commercial quantities by fractional crystallization. The feed to a crystallization unit is commonly a xylene fraction separated from catalytically reformed naphtha by careful fractional distillation. Such a fraction will ordinarily contain from 5 to 10% of nonaromatic hydrocarbons and from 5 to 15% ethyl benzene, in addition to ortho-, meta-, and para-xylene. In some instances the feed to the crystallization unit is prepared by a combination of extractive distillation and careful fractional distillation and is substantially free of nonaromatic hydrocarbons. In either type of feed the $C_8$ aromatic isomers are present in the following proportions:

| | Percent by volume |
|---|---|
| Ortho-xylene | 20 to 27 |
| Meta-xylene | 50 to 54 |
| Para-xylene | 20 to 25 |
| Ethyl benzene | 5 to 12 |

These proportions represent the equilibrium composition of a $C_8$ aromatic fraction produced by dehydrogenation of naphthenic hydrocarbons, and the precise composition of a given equilibrium mixture depends upon the temperature at which the aromatic hydrocarbons are produced. For example, the ethyl benzene and ortho-xylene content of an equilibrium mixture of the isomer increases with an increase in temperature, whereas the meta- and para-xylene content decreases with an increase in temperature.

Only about half of the para-xylene contained in these fractions is ordinarily separated by fractional crystallization. In order to obtain incremental production of para-xylene, it is desirable to isomerize the mother liquor produced in the fractional crystallization process. From the foregoing, it will be evident that such a mother liquor will contain well above 15% by volume of ortho-xylene, ordinarily 25 to 35% by volume, and less than 15% by volume of para-xylene, usually from 8 to 13% by volume of para-xylene.

It has now been found that xylene mixtures suitable for use as isomerization feeds can be advantageously processed by fractionally distilling them to separate an overhead fraction comprising meta-xylene and para-xylene and having an ortho-xylene content below about 15% by volume, and contacting the overhead fraction with a silica-alumina catalyst at a temperature in the range from about 700° F. to 1000° F.

During the contact of the feed with the silica-alumina catalyst under isomerization conditions, the isomerizing efficiency of the catalyst gradually declines due to the deposition of carbonaceous material on the catalyst. The catalyst, therefore, is periodically regenerated by contacting it with a free oxygen-containing gas at a temperature in the range from about 900° F. to 1100° F. to burn the carbonaceous deposits from the catalyst surface. Pursuant to the process of the present invention the regenerated catalyst is contacted with steam at a temperature in the range from 800° F. to 1000° F. for a period of 2 to 20 minutes immediately following the regeneration and prior to resuming contact of the catalyst with the feed.

It is an object of the present invention to carry out the isomerization of a mixture of ortho-, meta-, and para-xylenes to produce increased yields of para-xylene over what has been obtained in the past.

Other objects will be apparent upon a fuller understanding of the invention herein described.

Pursuant to this invention, a mixture of xylene isomers, deficient in para-xylene in respect to the xylene equilibrium of the isomers ortho-, meta-, and para-xylene, is first introduced into a distillation zone. This mixture contains ortho-xylene in excess of about 15% by volume, less than about 15% by volume of para-xylene, and the remainder of the mixture is predominantly meta-xylene, with ethyl benzene, $C_7$ and $C_9$ fractions and paraffins present in small amounts. The composition of the feed to the distillation zone as set forth above is the result of previous processing in which a narrow $C_8$ cut containing xylene isomers in approximately equilibrium proportions is separated from catalytically reformed naphtha. A portion of the para-xylene is removed from this cut by fractional crystallization. The mother liquor produced in the crystallization which constitutes the feed employed in the present invention has a para-xylene content of less than 15% by volume, and an ortho-xylene content in excess at 15% by volume, since no appreciable amounts of ortho-xylene are removed with the para-xylene and the equilibrium mixture is unchanged except for the reduction in para-xylene content.

According to this invention, as noted above, the mixture is introduced into a distillation zone to remove a major proportion of the ortho-xylene and the hydrocarbons with higher boiling points than ortho-xylene. This separation is a difficult one in that the boiling points of the isomers in question are quite close together as shown in Table 1.

TABLE 1

| | Boiling Pt., ° C. |
|---|---|
| o-Xylene | 144 |
| m-Xylene | 139 |
| p-Xylene | 138 |
| Ethylbenzene | 136 |

By efficient fractional distillation an overhead fraction comprising meta-xylene, para-xylene, ethylbenzene and having an ortho-xylene content less than about 15% by volume and preferably below 10% by volume is separated from a bottoms fraction consisting predominantly of ortho-xylene.

The purpose in removing most of the ortho-xylene from the mixture prior to isomerization is to increase the degree of conversion to para-xylene in the isomerization step. Higher ortho-xylene concentration in the feed to the isomerization zone tends to decrease conversion to para-xylene for any given set of operating conditions.

The effect of ortho-xylene concentration in the feed to the isomerization zone is graphically portrayed in Figure 1 in which the ordinate is the weight percent of ortho-xylene in the feed (xylene basis) and the abscissa is the percent of para-xylene approach to equilibrium (xylene basis). The weight percent of ortho-xylene is expressed on a 100% xylene basis, i. e., the weight of the ortho-xylene present divided by the total weight of only the three isomers, ortho-, meta-, and para-xylene present in the feed, multiplied by 100, ignoring the presence in the feed of any component except xylene. Thus, the weight of ethylbenzene, $C_7$ and $C_9$ fractions, and any paraffins present is disregarded. The percent para-xylene equilibrium approach based on xylene present in the feed is calculated as follows:

Percent p-xylene equilibrium approach =

$$\frac{(\text{p-xylene in product}) - (\text{p-xylene in feed})}{(\text{p-xylene at equilibrium}) - (\text{p-xylene in feed})} \times 100$$

The xylene concentrations are expressed on a 100% xylene basis, and the theoretical xylene equilibrium values used are those reported by Rossini et al. and are given in Table 2.

TABLE 2

EQUILIBRIUM CONCENTRATIONS OF THE $C_8$ ALKYLBENZENES [1]

| Temperature, °F. | Composition, in mole fraction, of equilibrium mixture of isomers | | | | | | | |
|---|---|---|---|---|---|---|---|---|
| | Ethylbenzene | | o-Xylene | | m-Xylene | | p-Xylene | |
| | $C_8$ Basis | Xylene Basis | $C_8$ Basis | Xylene Basis | $C_8$ Basis | Xylene Basis | $C_8$ Basis | Xylene Basis |
| 600 | 0.057 | | 0.215 | 0.228 | 0.503 | 0.533 | 0.225 | 0.239 |
| 700 | 0.069 | | 0.220 | 0.236 | 0.491 | 0.528 | 0.220 | 0.236 |
| 800 | 0.083 | | 0.224 | 0.244 | 0.478 | 0.522 | 0.215 | 0.234 |
| 900 | 0.097 | | 0.226 | 0.250 | 0.467 | 0.517 | 0.210 | 0.233 |
| 1,000 | 0.110 | | 0.228 | 0.256 | 0.457 | 0.513 | 0.205 | 0.231 |

[1] Rossini et al.; Jour. of Research Nat'l. Bureau of Standards, RP 1732, vol. 37, p. 115, August 1946.

Referring to Figure 1, the effect of the ortho-xylene concentration in the feed is apparent. Under the same conditions, i. e., at isomerization runs under the same conditions of temperature and feed rate, expressed as liquid hourly space velocity (LHSV) or volumes of liquid feed per bulk volume of isomerization catalyst per hour, but varying the ortho-xylene concentration in the feed, it is found that the percentage of para-xylene approach to equilibrium increased as the ortho-xylene concentration in the feed decreased. For example, operating at 800° F. and LHSV of 1 with 12% by weight ortho-xylene in the feed, 95% approach to para-xylene equilibrium is obtained, while with 99% ortho-xylene and operating at the same temperature and feed rate, the para-xylene approach to equilibrium is only about 3%.

Figure 2:
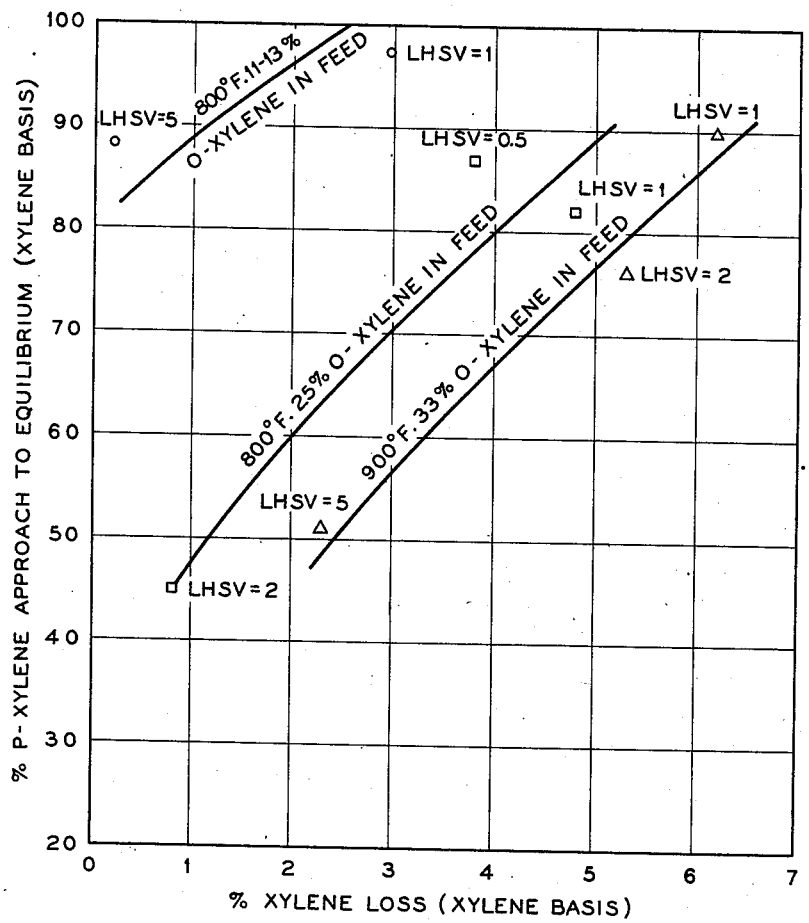

A further discovery concerning the effect of ortho-xylene concentration in the feed is that there is a correlation between the ortho-xylene concentration in the feed and xylene losses due to disproportionation and cracking for a given approach to p-xylene equilibrium. Xylene loss during the process increases with increasing ortho-xylene content in the feed. This is illustrated by Figure 2, in which xylene losses are plotted against the para-xylene approach to equilibrium and the parameters representing ortho-xylene concentrations. Figure 2 shows that both xylene losses and para-xylene approach to equilibrium increase with a decrease of feed rate (LHSV), but it also indicates that increased ortho-xylene concentration decreases the para-xylene approach to equilibrium (as noted above) and increases the xylene loss. For example, to approach to 85% of para-xylene equilibrium with 11–13% by weight ortho-xylene in the feed (xylene basis), the xylene losses are less than 1%, while with 33% ortho-xylene in the feed, the losses increase to 5–6%.

From the above, it is apparent that by first reducing the ortho-xylene content of the feed to the isomerization zone to less than about 15% by volume by super-fractionating, increased production of the desired para-xylene isomer is obtained in the isomerization of xylene-containing feed stock, and also xylene losses by disproportionation and cracking are considerably reduced.

The isomerization of the above-described feed stock is carried out by contacting the feed at a temperature in the range about 700° F.–1000° F. with a silica-alumina catalyst. The silica-alumina ($SiO_2$—$Al_2O_3$) catalyst em- ployed in the process of the invention may be described as clay-type cracking catalysts. These may be either naturally occurring silica-alumina clays, synthetic clays, or, preferably, synthetic cracking catalysts in the form of granules of highly porous structure commonly used in cracking petroleum hydrocarbons.

Figure 3:
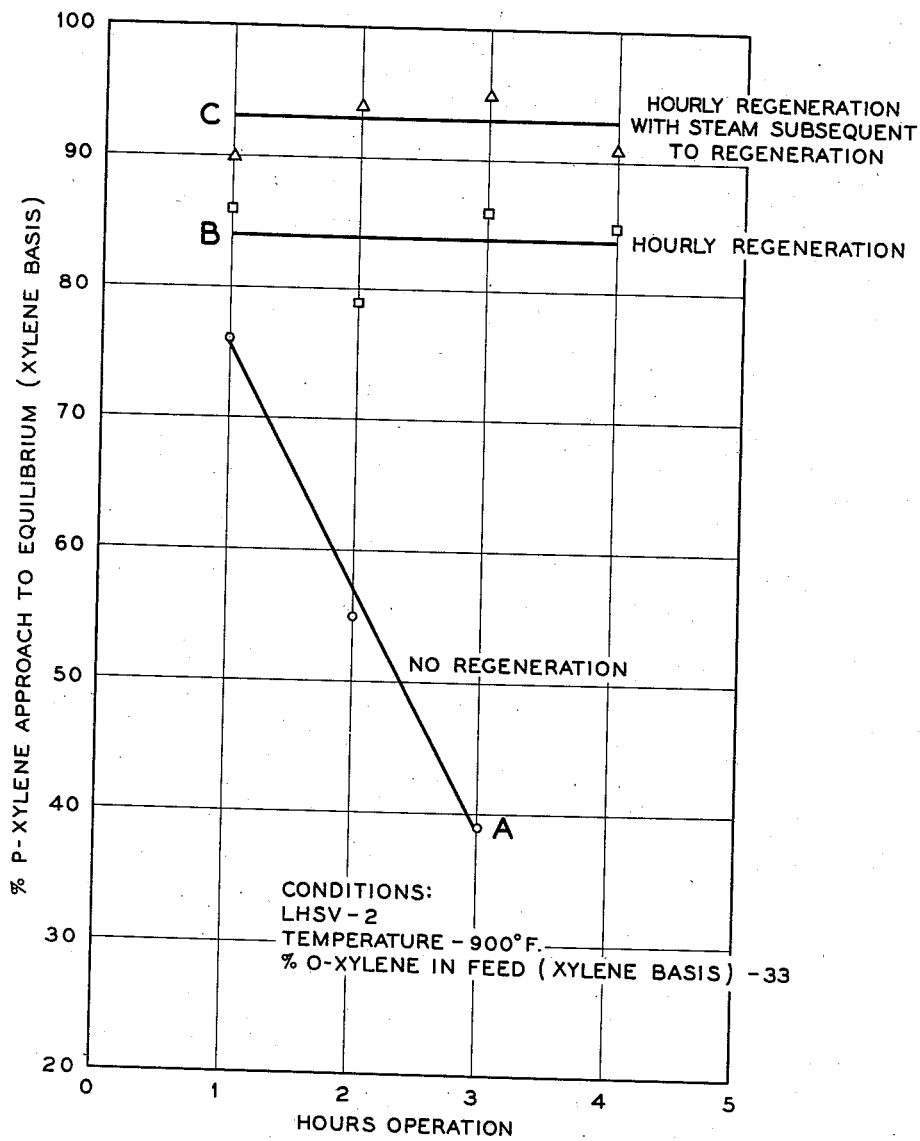

The catalyst can be maintained on stream for between about 1 hour and 20 hours to effect isomerization of xylenes, but it is found that the para-xylene approach to equilibrium drops from about 80% at the end of the first hour on stream to roughly 40% at the end of the third hour when contacting a 33% ortho-xylene containing feed at 900° F. and a liquid hourly space velocity of 2. This is shown by line A, Figure 3, in which hours of operation are plotted against percent para-xylene approach to equilibrium (xylene basis). However, it is observed that the catalyst activity decline for operating periods of from 4 to 8 hours was slight when the feed stock to the isomerization step contains less than the equilibrium concentration of ortho-xylene at temperatures up to 900° F. and at liquid hourly space rates of 1 or higher. For example, a feed containing less than 13% by weight (xylene basis) of ortho-xylene was contacted with the alumina-silica catalyst at 900° F. and an LHSV of 2, the para-xylene approach to equilibrium was 93% at the end of the first hour on stream, 94% at the end of the fourth hour, and 99% at the end of the eighth hour on stream. This is further indication that the ortho-xylene concentration has a distinct effect upon the para-xylene approach to equilibrium, and that the step of first reducing the ortho-xylene concentration prior to isomerizing increases the yield of para-xylene.

As noted above, the ortho-xylene concentration of the feed greatly affects the rate of carbon deposition upon the catalyst which reduces conversion, but despite the composition of the feed, eventually the activity of the catalyst declines to a point where process efficiency requires that it be subjected to regeneration treatment. Regeneration is accomplished by passing air or any other gas containing uncombined oxygen through the catalyst mass for a sufficient length of time and under controlled temperature in the range of about 700° F.–1000° F. such that carbonaceous deposits are burned from the pores of the catalyst mass. The effect of hourly regeneration is shown by line B, Figure 3, which indicates that a feed composed of 33% ortho-xylene by weight, at a temperature of 900° F. and an LHSV of 2, with hourly regeneration, results in high (84%) conversion that remains fairly constant for a period of 4 hours. This should be contrasted with line A, Figure 3, in which the same feed, temperature and LHSV but with no regeneration results in a rapid decrease of conversion of from about 75% to 40% in three hours.

A still further discovery according to the present invention is that the passage of steam through the catalyst from 2 to 20 minutes immediately subsequent to regeneration increases the degree of conversion to para-xylene. A preferred cycle consists of contacting the catalyst with the xylene-containing feed for one hour, passing steam through the catalyst for 5 minutes, passing air through the catalyst for 50 minutes, and again passing steam through the catalyst mass for 5 minutes. Increased conversions to para-xylene amounting to about 10% closer approach to equilibrium are obtained using the improvement of steam passage through the catalyst immediately after the regeneration step, and this is graphically shown by line C, Figure 3.

The invention is illustrated by the following examples, in which all percentages shown are in weight percent.

Example 1

A xylene mixture containing 16.8% ethylbenzene, 8.4% (12.8% xylene basis) ortho-xylene, 48.2% (73.9% xylene basis) meta-xylene, 8.7% (13.3% xylene basis) para-xylene, and 17.9% nonaromatics was isomerized in a reactor at a pressure of 1 atmosphere, 800° F., and a liquid hourly space velocity of 1 over a silica-alumina catalyst in the form of high surface area head. The yield from the reactor was in excess of 99% by weight of liquid, with the remainder gas and carbon. The product distribution was as follows: light ends of $C_7$ and lighter, 2.2%; center cut of the $C_8$ boiling range, 94.6%; and a heavy ends of $C_9$ and heavier of 3.2%. The analysis of the $C_8$ center cut was as follows:

| | | |
|---|---|---|
| Ethylbenzene | 15.8% | |
| Ortho-xylene | 14.0% | Xylene basis, 20.3% |
| Meta-xylene | 39.0% | Xylene basis, 56.7% |
| Para-xylene | 15.8% | Xylene basis, 23.0% |
| Nonaromatics | 15.4% | |

The approach to para-xylene equilibrium was 95%.

The losses, all based on weight percent of the total feed were:

| | Percent |
|---|---|
| Xylene loss | 0.2 |
| Ethylbenzene loss | 1.9 |
| Nonaromatics loss | 3.3 |

Example 2

A xylene mixture containing 18.1% ethylbenzene, 16.4% (24.7% xylene basis) ortho-xylene, 41.3% (62.2% xylene basis) meta-xylene, 8.8% (13.1% xylene basis) para-xylene, and 15.4% nonaromatics was isomerized under identical conditions of temperature, pressure, feed rate, and catalyst composition and surface areas as those employed in Example 1. The yield from the reactor was in excess of 99% by weight of liquid. The product distribution was as follows: light ends of $C_7$ and lighter, 3.3%; center cut of $C_8$ boiling range, 92.8%; and a heavy ends of $C_9$ and heavier of 3.9%. The analysis of the $C_8$ center cut was as follows:

| | | |
|---|---|---|
| Ethylbenzene | 18.7% | |
| Ortho-xylene | 15.8% | Xylene basis, 22.7% |
| Meta-xylene | 39.3% | Xylene basis, 56.5% |
| Para-xylene | 14.4% | Xylene basis, 20.8% |
| Nonaromatics | 11.8% | |

The approach to para-xylene equilibrium was 75%.

The losses (weight percent of total feed) were:

| | Percent |
|---|---|
| Xylene loss | 2.0 |
| Ethylbenzene loss | 0.7 |
| Nonaromatics loss | 4.4 |

It should be noted that, in the above two examples, identical pressure, temperature, feed rate, and catalyst conditions existed, but that the ortho-xylene content of the feed in Example 2 was approximately double the ortho-xylene content of the feed in Example 1, i. e., in Example 2 the ortho-xylene weight percent was 16.4% (24.7% xylene basis), as opposed to Example 1 in which the percentage was 8.4% (12.8% xylene basis). Thus, with the percentage of ortho-xylene present in the feed the only variable effecting the approach to equilibrium, the isomerization of the lower-ortho-xylene content feed illustrated by Example 1 resulted in a 95% para-xylene approach to equilibrium, whereas only a 75% para-xylene approach to equilibrium was realized utilizing a feed with double the ortho-xylene content. Example 1, therefore, illustrates the process of the invention by which the ortho-xylene content of the feed to the isomerization step is less than 10% by volume.

Although this invention has been illustrated with various embodiments and specified process conditions have been described, alterations utilizing the principles thereof will occur to those skilled in the art, and it is to be understood that the invention may be otherwise embodied or practiced within the scope of the appended claim.

We claim.

A process for increasing the para-xylene content of xylene mixtures containing ortho- meta-, and para-xylenes and having a para-xylene content below about 15% by volume and an ortho-xylene content above about 15% by volume which comprises fractionally distilling the xylene mixture to separate an overhead fraction comprising meta- and para-xylenes and having an ortho-xylene content below about 10% by volume, contacting the overhead fraction with a silica-alumina catalyst at a temperature in the range about 700° F. to 1000° F., periodically regenerating the catalyst by contacting it with a free oxygen-containing gas to remove carbon deposited on the catalyst during the feed contacting step, and passing steam through the catalyst for a period of 2 to 20 minutes immediately subsequent to the regeneration step.

References Cited in the file of this patent

UNITED STATES PATENTS

| | | |
|---|---|---|
| 2,307,895 | Naiman | Jan. 12, 1943 |
| 2,375,757 | Bates | May 15, 1945 |
| 2,403,757 | Reeves | July 9, 1946 |
| 2,432,745 | Gary | Dec. 16, 1947 |
| 2,532,276 | Birch et al. | Dec. 5, 1950 |
| 2,681,304 | Blanding et al. | June 15, 1954 |
| 2,698,305 | Plank | Dec. 28, 1954 |
| 2,719,183 | Boedeker et al. | Sept. 27, 1955 |